United States Patent [19]
Pomara, Jr.

[11] Patent Number: 5,115,907
[45] Date of Patent: May 26, 1992

[54] TRAY ACCUMULATOR

[76] Inventor: Johnny B. Pomara, Jr., 2730 Oak Tree, Suite 1703, Carrollton, Tex. 75006

[21] Appl. No.: 694,659

[22] Filed: May 2, 1991

[51] Int. Cl.$^5$ .................................. B6GB 25/00
[52] U.S. Cl. .................................. 198/744; 198/718
[58] Field of Search .......... 198/744, 718, 464.2, 198/738, 746, 468.01, 347

[56] References Cited

U.S. PATENT DOCUMENTS

| | | | |
|---|---|---|---|
| 3,811,548 | 5/1974 | Neff | 198/744 X |
| 3,888,344 | 6/1975 | Major | 198/746 X |
| 4,202,440 | 5/1980 | Niki | 198/744 X |
| 4,349,099 | 9/1982 | Wiknich et al. | 198/718 X |
| 4,484,676 | 11/1984 | Plumridge et al. | 198/744 X |
| 4,813,222 | 3/1989 | Fukuda et al. | 198/744 X |
| 4,875,572 | 10/1989 | Kiriake | 198/744 |

FOREIGN PATENT DOCUMENTS 2818868 10/1979 Fed. Rep. of Germany ...... 198/744

0072513 5/1982 Japan .................................. 198/718
2069437 8/1981 United Kingdom ................ 198/718

*Primary Examiner*—Robert P. Olszewski
*Assistant Examiner*—James R. Bidwell
*Attorney, Agent, or Firm*—Johnson & Gibbs

[57] ABSTRACT

A tray accumulator for storing and moving trays between a load area and an unload area including a tray conveyor extending from load to unload area, a tray operated control switch at the load end of the conveyor for turning on and operating the conveyor to move a tray along the conveyor when the tray is placed at the load end of the conveyor, control switches at the unload end of the conveyor for deactivating the conveyor when fully loaded with trays and for cycling the conveyor during the unload mode of operation responsive to sequential removal of trays from the unload end, and a fluid operated power and control system connected with the conveyor and the control switches to reciprocate the conveyor and control the conveyor during the load and unload phases.

2 Claims, 3 Drawing Sheets

TRAY ACCUMULATOR

BACKGROUND OF THE INVENTION

1. Field of the Invention

This invention relates to apparatus for the handling of trays, particularly, trays used in handling food in the restaurant industry such as in cafeterias. More particularly, this invention relates to the collection of trays between the eating area and the kitchen or clean up area of a restaurant or cafeteria.

2. History of the Prior Art

The collection and temporary storage of trays, especially in cafeteria type food services, has been a somewhat disorganized function. Generally, where patrons are expected to dispose of their own trays in a cleaning or adjacent to a cleaning area, such as in school food service facilities, service windows are often provided through which the patron places the tray on a table or other supporting surface behind the window. Such collection areas rapidly become cluttered with unstacked trays and dirty dishes in random arrangement around the collection area. Currently available tray accumulators are electrically operated using electric motors and switches. Such tray accumulators for sanitary purposes have to be washed down with water which is dangerous for maintenance persons and often will short-out the motors and switches. No organized, mechanized system is available for the handling of dirty trays in such food facilities.

The system of the present invention provides for the organized handling of dirty trays, transporting them from the food serving and eating area to collection points for handling in the dish and tray cleaning area.

The tray accumulator of the present invention is operated by fluid pressure such as air, eliminating the possibility of electric shorts and electrical danger to persons operating and servicing the system. Further, the accumulator employs no belts, no rollers, no chains, no shafts, nor ball bearings or pulleys, and thus, involves significantly less maintenance problems.

SUMMARY OF THE INVENTION

This invention is a tray accumulator and temporary storage system including a tray conveyor track extending from a load end to an unload end for holding and moving several trays in end-to-end array, a pusher bar arranged beneath the conveyor track extending from the load end to the unload end, spaced tray pushers secured along the push bar at tray length intervals, for reciprocating the push bar to move trays along the conveyor, tray lever switches at the load and unload ends of the conveyor for controlling the push bar, and an unload switch at the unload end for initiating the unload mode of operation of the accumulator.

BRIEF DESCRIPTION OF THE DRAWINGS

For a complete understanding of the present invention and its objects and advantages, reference is made to the following description taken in conjunction with the accompanying drawings wherein.

DETAILED DESCRIPTION OF THE PREFERRED EMBODIMENT

Figure 1:
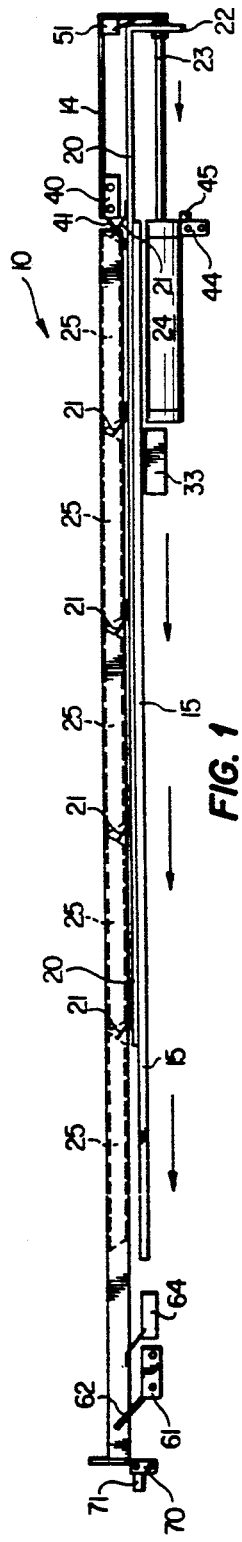
FIG. 1 is a schematic side view in elevation showing the tray accumulator in a starting mode of operation in which a first tray has been placed on the track at the load end and showing other trays in phantom lines along the track toward the unload end.

Referring to the drawings, a tray accumulator 10 embodying the features of the invention includes a conveyor having a track formed by parallel track rails 11 arranged on suitable support members, not shown, at a convenient height and spaced apart slightly farther than the width of trays to be handled by the accumulator. The tracks 11 may be formed of suitable angle iron and mounted at a height comfortable for use by persons placing dish loaded trays on the track. The track has a load end 12 where trays are placed on the track and an unload end 13 where trays are removed from the track for cleaning and reuse. A rectangular tray plate 14 is mounted horizontally adjacent to the load end 12 of the track with the top surface of the tray plate being aligned substantially with the top edges of the track rails 11, as evident in FIGS. 1–3. A channel shaped pusher bar 15 is mounted parallel with and midway between and slightly below the rails 11. An elongated pusher bar 20 is supported for sliding reciprocating movement in the channel 15 below the tracks 11. Longitudinally spaced tray pusher clips 21 are mounted along the top face of the pusher bar 20. The pusher clips 21 are spaced apart substantially the length of the trays to be handled on the accumulator. The pusher clips are preferably formed of upwardly bent spring steel so that they will spring upwardly and each engage a tray during the loading mode and fold downwardly during the retract mode of the pusher bar. The pusher bar channel 15 provides lengthwise support and a bearing surface for the pusher bar 20. At the load end 12 of the track, the pusher bar is connected with a vertical plate 22 which is secured along an end portion of a piston rod 23 of a load cylinder 24 which drives the rod 23 to extend and retract for reciprocating the pusher bar and pusher clips mounted on the bar. The track rails 11 support and store trays 25 as the trays are moved from the load end 12 to the unload end 13 of the track by the reciprocating clips 21 on the pusher bar 20 which is driven by the reciprocating piston rod 23.

Figure 8:
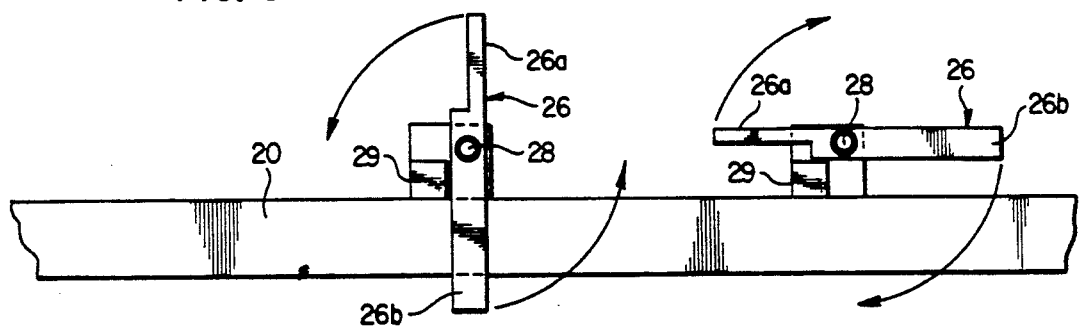
FIG. 8 is a fragmentary side view in elevation of the pusher bar with an alternate tray pusher design showing one tray pusher at a tray pushing position and the other tray pusher at a folded return position.
Figure 9:
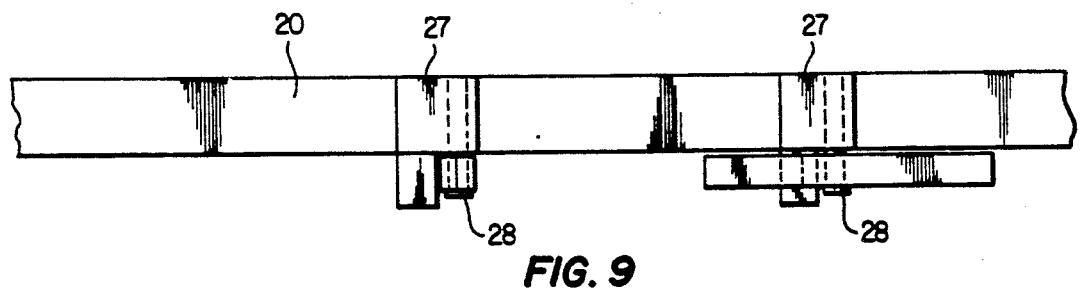
FIG. 9 is a fragmentary top plan view of the portion of the pusher bar and tray pushers shown in FIG. 8.
Figure 10:
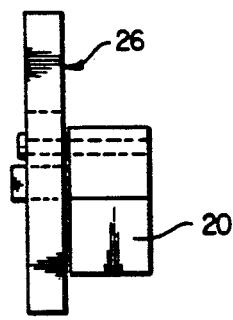
FIG. 10 is an end view in section and elevation of the pusher bar and one of the pusher clips in a pushing position.
Figure 11:
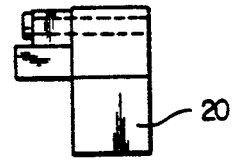
FIG. 11 is an end view in section and elevation of the pusher bar and one of the pusher clips in a folded return position.

An alternate design of pusher clip is illustrated in FIGS. 9-11. Referring to the drawings, pusher clips 26 are pivotedly mounted along the pusher bar 20 on mounting blocks 27. Each of the pusher clips is rotatably supported on a pin 28 for movement between a vertical pushing position and a horizontal return position. In FIG. 8 the left pusher clip is shown at a vertical pushing position while the right clip is shown at a folded return position. The blocks 27 have a stop portion 29 engageable by the rotatable pusher clip to limit the vertical and horizontal positions of the clips so that each clip is rotatable 90 degrees between the vertical pushing position and the horizontal return position. An upper portion 26a of each of the pusher clips is reduced in thickness so that the lower portion 26b is heavier, and thus, provides an unbalanced pusher clip which is gravity controlled so that it readily returns to the vertical position when not moving in a return direction beneath a tray on the trach rails 11.

Figure 7:
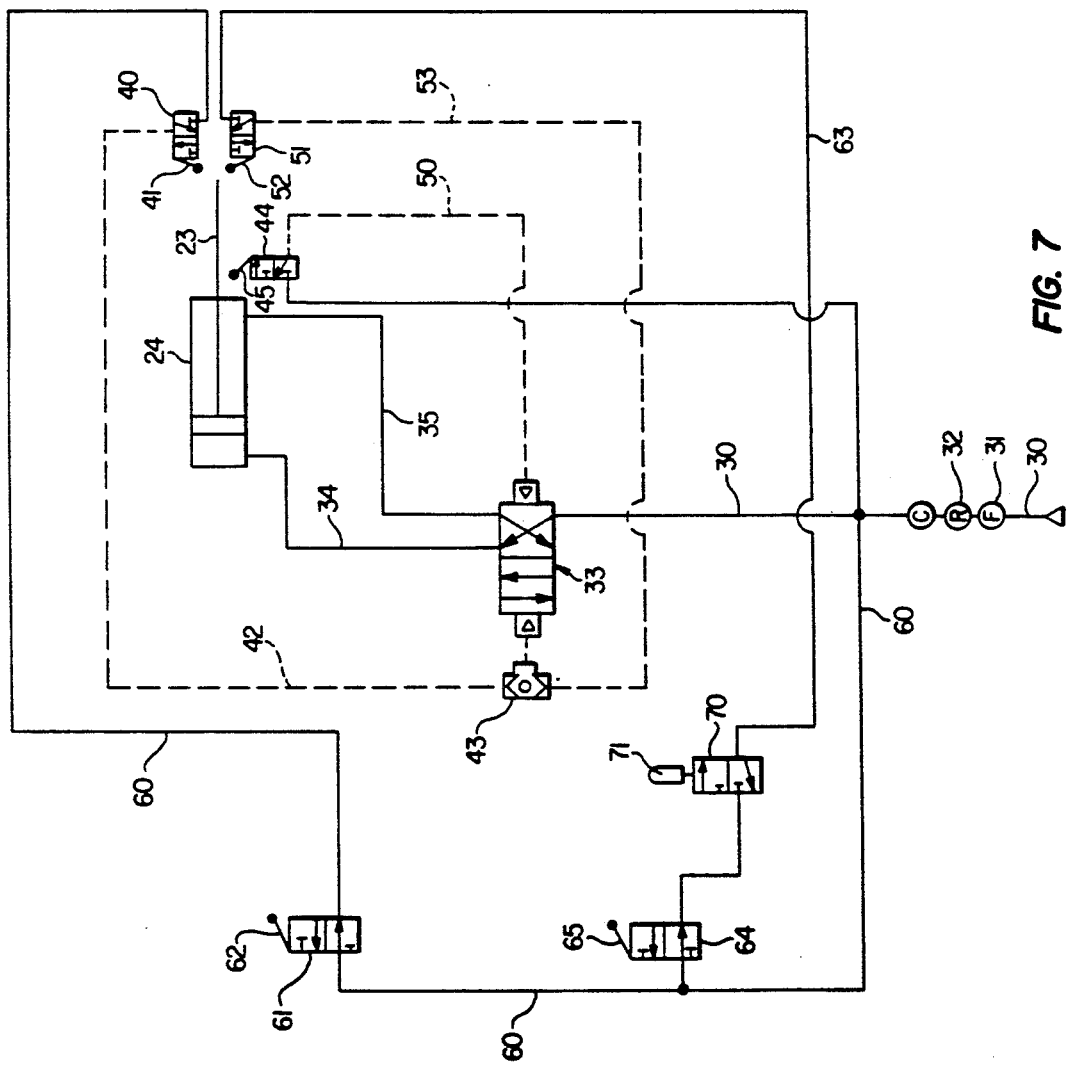
FIG. 7 is a schematic diagram of the air control circuit of the tray accumulator.

The tray accumulator 10 is preferably powered and controlled by an air circuit including appropriate switches and valves mounted on the apparatus and interconnected as illustrated diagrammatically in FIG. 7. The system is supplied with air from an air compressor, not shown, through a line 30 connected through a filter 31 and a regulator 32 extending to a four-way valve 33 which controls flow of air to the opposite ends of the cylinder 24 for extending and retracting the piston rod 23. The valve 33 is connected with the cylinder 24 by a line 34 for supplying air to the cylinder to extend the piston and by a line 35 which supplies air to the cylinder for retracting the piston rod. A two-way airtight limit switch or valve 40 is mounted on the tray plate 14 at the load end of the tray accumulator with a switch operating lever 41 extending toward the tracks 11 from beneath the tray plate for operation by a tray being loaded from the tray plate to the tracks. The switch 40 is connected by a pilot air line 42 to a shuttle valve 43 through which air is provided into one end of the valve 33. During the loading mode, the lever 41 is operated by trays being loaded on the accumulator to supply air through the line 42 and the shuttle valve 43 to the valve 33 to sequentially cause the piston rod 23 to retract as each tray is loaded. A two-way limit switch 44 having a lever 45 is mounted at the head end of the cylinder 24 for engagement by the plate 22 on the piston rod 23 each time the piston rod retracts to control the extension of the piston rod by the supplying air into the cylinder 24. The switch 44 is connected by a pilot air line 50 into the valve 33 at the opposite end of the valve 33 from the shuttle valve 43 to shift the valve 33 to the position illustrated in FIG. 7 in which power air is supplied through the line 35 into the cylinder 24 to extend the piston rod 23. A limit switch 51 having an operating lever 52 is mounted on the bottom of the load tray 14 positioned for engagement by the piston rod plate 22 when the piston rod is fully extended during the unload mode of operation of the tray accumulator. The switch 51 is connected by a pilot air line 53 to the shuttle valve 43. The shuttle valve 43 is a three-way valve which shifts between positions to supply air from either the line 42 or the line 53 into the valve 33 to admit power air into the cylinder 24 to control retraction of the piston rod during the load mode as operated by the switch 40 and during the unload mode as operated by the switch 51. The shuttle valve functions to supply pilot air to the valve 33 from either the limit switch 40 or the limit switch 51 but never simultaneously from both limit switches. The limit switches 40, 44, and 51 are all normally closed preventing air flow through them and are each opened by the lever connected with the switch as actuated by a loading tray in the case of the switch 40 and by the piston rod plate 22 in the case of the limit switches 44 and 51. The limit switch 40 is supplied with air through a line 60 which connects to the switch 40 through a normally open limit switch 61 having an operator lever 62. The limit switch 61 is mounted at the unload end of the tray accumulator beneath and between the track rails 11 so that the switch lever 62 is contacted by a tray at the unload end as evident in FIG. 3. The limit switch 51 is connected with the air line 60 by a line 63 through both a normally open two-way limit switch 64 having an operator lever 65 and a manually operated, normally closed, two-way load switch 70 having a switch operator 71. The switch 64 is mounted between and below the track rails 11 at the unload end of the tray accumulator positioned so that the lever 65 is engaged by a tray 25 on the unload end of the tray accumulator for shutting off the air supply to the limit switch 51 when a tray is resting at the unload end of the tray accumulator. The load switch 70 also is mounted at the unload end of the tray accumulator for manual operation between load and no-load modes.

OPERATION

The initial step in the operation of the tray accumulator 10 is to turn on the air supply, not shown, to the line 30 to provide an air through the filter 31 and regulator 32 to the cylinder 24 and the various valves and limit switches of the accumulator. The load switch lever 71 is placed in the load position closing the valve 70 so that there is no air supply through the line 63 to the limit switch 51. Air does, however, flow through the line 60 and the normally open limit switch 61 to the normally closed limit switch 40 at the load end of the accumulator on the tray plate 14. When air is initially supplied to the tray accumulator, the air pressure supplied through the line 30 and the four-way valve 33 to the piston 24 in the line 34 from the valve 33 will extend the piston rod 23 to the position illustrated in FIG. 1 at which the pusher bar 20 with the pushers 21 are at load positions as illustrated in FIG. 1. If, when the air supply is turned on, the piston 23 is not fully extended, or the valve 33 is not in a position to supply air to fully extend the piston rod, the cylinder 24 and piston rod 23 will cycle to the extended position. If, when the air supply is turned on, the valve 33 is positioned as illustrated in FIG. 7 and the piston rod 23 is not fully extended, the air supply through the line 30, the valve 33 and the line 34 into the cylinder 24 will extend the piston rod to the maximum position shown in FIG. 1. If, on the other hand, the valve 33 is at an opposite end position from that shown in FIG. 7 when the air supply is initially turned on, air will flow through the line 35 from the valve 33 into the head end of the cylinder 24 retracting the piston rod until the plate 22 on the piston rod engages the limit switch operator 45 on the limit switch 44 opening the normally closed limit switch 44 to supply air through the line 50 to shift the four-way valve 33 toward the left to the position illustrated in FIG. 7 at which the air supply will then be directed into the opposite left end of the cylinder 24 extending the piston rod 23 back to the end position of FIG. 1.

Figure 2:
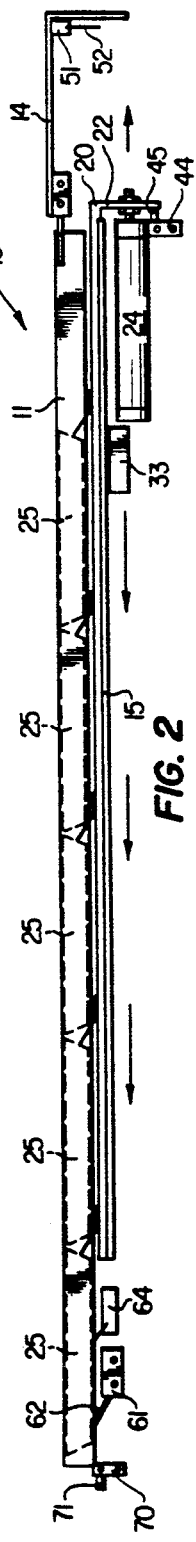
FIG. 2 is a schematic side view in elevation showing the tray accumulator at the beginning of the unload mode.
Figure 3:
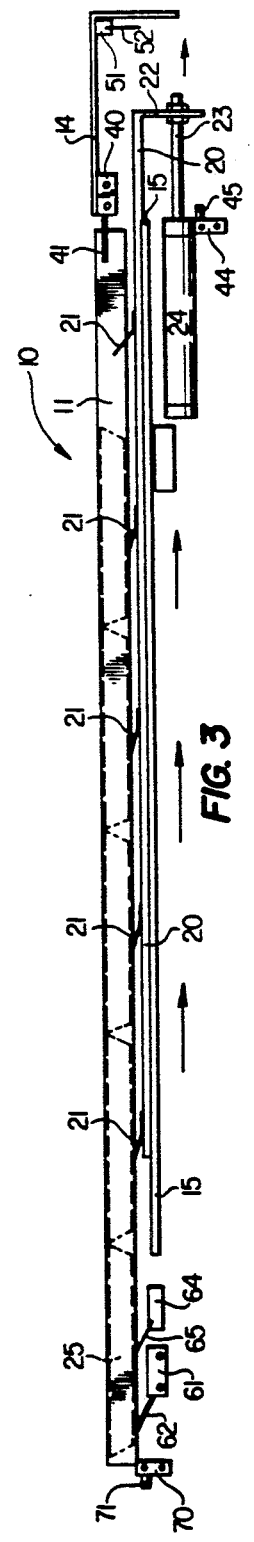
FIG. 3 is a schematic side view in elevation showing the tray accumulator recycling to accept another tray.
Figure 4:
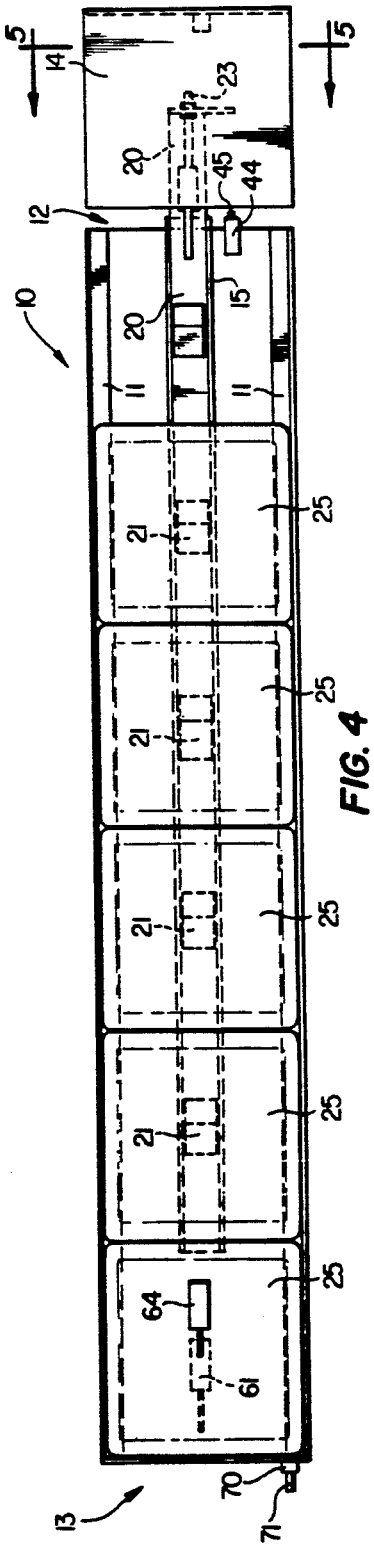
FIG. 4 is a top plan view of the tray accumulator showing the pusher bar assembly in phantom lines with the accumulator loaded.
Figures 5, 6:
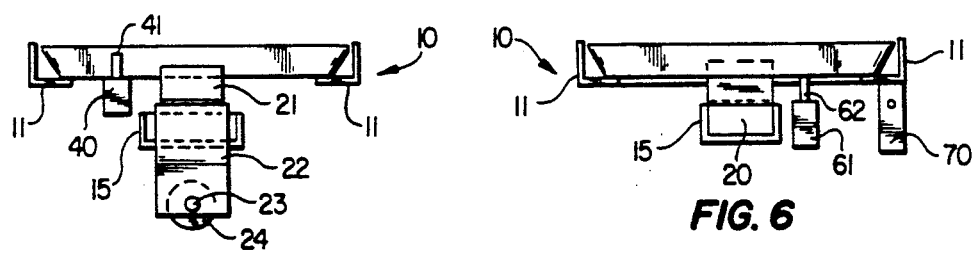
FIG. 5 is a view in section and elevation along the line 5—5 of FIG. 4.
FIG. 6 is an unload end view in elevation of the tray accumulator.

With the piston rod 23 and the pusher bar 15 with the pusher clips 21 at the positions of FIG. 1 and a first tray 25 resting on the track depressing the switch lever 41, the limit switch 40 is opened supplying air through the line 42 and the shuttle valve 43 into the four-way valve 33 shifting the four-way valve to the right end retract position at which air is supplied through line 35 to the head end of the piston 24. The piston rod 23 with the push bar 20 and the pusher clips 21 begins travel to the left toward the unload end of the tray accumulator. The pusher clips 21 are sprung upwardly to the load positions illustrated in FIGS. 1 and 2, the right end clip engaging the end edge of the tray 25 moving the tray to the left along the track away from the switch lever 41 which swings back up to the position shown in FIGS. 2 and 3 at which position the limit switch recloses shutting off pilot air to the shuttle valve 43. If the form of pusher clips 26 illustrated in FIGS. 8-11 are used, gravity holds the pusher clips vertical so that the right end clip is properly positioned for engaging the tray. The retraction of the piston rod 23 continues moving the pusher bar 20 and the pusher clips 21 toward the unload end 13 a full stroke to the position illustrated in FIG. 2 at which the first tray 25 is moved to a second position toward the unload end away from the load end 12 as illustrated in FIG. 2. When the piston rod is fully retracted, the plate 22 strikes the switch lever 45 of the limit switch 44 opening the limit switch supplying pilot air through the line 50 to the four-way valve 33 shifting the valve back to the position of FIG. 7 at which power air is supplied to the cylinder 24 through the line 34 causing the piston rod 23 to again extend. As the piston rod extends toward the right as seen in FIG. 3, the piston rods pulls the pusher bar 20 along with the pusher clips 21 toward the right with the second clip from the load end folding downwardly so that it slides along the bottom of the first loaded tray as seen in FIG. 3 until the piston rod is again fully extended back to the position of FIG. 1. If the pusher clips 26 are used, the second clip from the load end pivots to the horizontal position rotating downwardly as it slides along the bottom of the first loaded tray. When the pusher clip has passed beneath the full length of the tray, the second clip springs back upwardly to engage the end edge of the tray as again illustrated in FIGS. 1 and 2. A second tray may then be loaded on the accumulator by placing the tray on the tray plate 14 and sliding it into the load position from the tray plate so that the tray drops downwardly to the track behind the first tray again depressing the lever 41 of the limit switch 40. The switch 40 is again opened supplying air through the pilot line 42 and the shuttle valve 43 to the valve 33 shifting the valve 33 to again cause the piston rod 23 to retract moving the pusher bar 20 and the pusher clips 21 again to the left shifting the first and second trays along the track away from the load end 12 of the accumulator. This sequence of loading the trays and the retraction and extension of the piston rod along with the pusher bar and pusher clips continues until the full length of the track is loaded with trays at which time the first tray loaded has moved to the unload end 13 enagaging the switch levers 62 and 65 of the limit switches 61 and 64 which are both normally open switches. At the end of the load mode, the piston rod is extended. With the limit switch 61 closed, air cannot flow through the line to the limit switch 40 so that the limit switch 40 is deactivated and the placing of another tray on the load end of the accumulator depressing the switch lever 41 will not cause the piston rod to retract so that the accumulator will not jam as a result of an additional tray being placed at the load end of the accumulator.

Within the accumulator conveyor fully loaded, it is then operated to unload the trays, one at a time, from the unload end 13. The hand operated load switch 70 is opened by the switch lever 71 supplying air through the valve 70 to the limit switch 51, which is normally closed. The piston rod 23 is now fully extended so that the plate 22 is engaging the operator lever 52 of the limit switch 51 thereby opening the limit switch. At this stage, however, the limit switch 64 is still closed because a tray still rests at the unload end of the track pressing the switch lever 65 of the switch 64 downwardly holding the switch closed. The first tray loaded, now at the unload end of the accumulator is lifted from the track allowing the switch levers 62 and 65 to spring back upwardly reopening the limit switches 61 and 64. The opening of the limit switch 64 supplies air through the load valve 70 to the limit switch 51 which is being held open by the piston rod plate 22 pressing against the switch operator lever 52. Air flows through the limit switch 51 to the shuttle valve 43 shifting the four-way valve 33 to the right to the retract position causing the piston rod 23 to again retract moving the trays along the track toward the unload end until the second tray loaded moves to the end position again deactivating the switches 61 and 64. When the piston rod fully retracts, the plate 22 strikes the valve operator lever 45 on the limit switch 44 shifting the four-way valve 33 back to the left to supply air through the line 34 to the cylinder 24 again extending the piston rod 23 to the fully extended end position of FIG. 1 at which the plate 22 again strikes the limit switch lever 52 opening the limit switch 51 again so that when another tray is lifted off at the unload end the air through the line 53 from the limit switch 51 will cause the cylinder 24 to retract the piston 23 moving the remaining trays along the track toward the unload end. This sequence is repeated sequentially lifting the trays from the unload end until the tray accumulator conveyor is empty. During the unload mode of operation, so long as a tray is resting on the track at the unload end 13, the limit switch 61 is held closed and thus placing a tray on the load end will not cause the accumulator to cycle.

When the tray accumulator is empty, the load switch lever 71 is moved back to the load position at which the switch 70 is closed and the process of reload the accumulator may begin.

It will now be seen that a new and improved system for the handling of trays particularly useful in cafeterias and school eating facilities has been described and illustrated. It will be further seen that the tray accumulator of the invention provides for the collection, temporary storage, and movement of trays to an unload location which may be in the cleaning area of the kitchen of the cafeteria or school eating facility.

What is claimed is:
1. A tray accumulator comprising:
   a tray conveyor track formed by parallel spaced apart rails having tray support surfaces and tray retention side flanges extending from a load end to an unload end of said conveyor;
   a pusher bar support channel mounted between and below said rails extending from said load end to said unload end;
   an elongated pusher bar slideably supported in said pusher bar channel for reciprocating movement therein;

a plurality of longitudinally spaced pusher clips spaced apart substantially the length of trays handled by said accumulator, each said pusher clip being a spring member having a first end portion secured along the top surface of said pusher bar and a second end portion biased upwardly and facing said unload end of said track, each said pusher clip folding downwardly along said pusher bar when said pusher bar is moved toward said load end of said track beneath one or more trays on said track and each said second end portion of each said pusher clip springing upwardly for engaging an end edge of a tray on said track when said pusher bar is moved toward said unload end of said track;

a fluid operated cylinder mounted beneath said track and having a reciprocatable piston extending toward the load end of said track, the free end portion of said piston rod being connected with said pusher bar at the load end of said track for reciprocating said pusher bar with said pusher clips in said pusher bar channel;

a tray plate mounted at said load end of said track having a tray support surface for supporting a tray as said tray is placed on said load end of said track;

power fluid supply means for providing power fluid under pressure to said fluid cylinder to reciprocate said piston rod for driving said pusher bar during load and unload modes of operation of said tray accumulator;

a power fluid supply line from said power fluid supply means;

a four-way fluid flow control valve connected with said power fluid supply means;

power fluid supply lines from said four-way valve to opposite ends of said fluid cylinder for supplying power fluid under pressure to said opposite ends of said cylinder selectively controlled by said four-way valve to reciprocate said piston rod during load and unload operational modes of said tray accumulator;

a three-way shuttle valve connected with one end of said four-way valve to supply control fluid under pressure for moving said four-way valve to a position for supplying power fluid to said cylinder to retract said piston rod;

a two-way normally closed first fluid limit switch secured on said tray plate at said load end of said track including an operator lever engageable by a tray moving from said tray plate to said load end of said track;

a control fluid pilot line from said first limit switch to said shuttle valve for operating said four-way valve to a position for supplying power fluid to said cylinder to retract said piston rod when a tray is loaded on said load end of said track engaging said lever on said first limit switch;

a power fluid supply line from said power fluid source to said first limit switch;

a second normally closed two-way fluid limit switch having a control lever secured for engagement when said piston rod fully retracts to effect extension of said piston rod;

a pilot fluid control line from said second limit switch to said four-way valve at the opposite end of said four-way valve from said shuttle valve to supply control fluid from said second limit switch to said four-way valve to shift said four-way valve to effect flow of power fluid into said cylinder to extend said piston rod;

a control fluid supply line from said power fluid source to said second limit switch;

a third normally open two-way fluid limit switch in said control fluid line from said power fluid source to said first limit switch, said third limit switch having a control lever and being mounted at said unload end of said track for engagement of a tray with said lever at said unload end of said track to deactivate said first limit switch to prevent jamming of said tray accumulator when said track is filled with trays;

a fourth two-way normally open fluid limit switch secured in a second control fluid supply line connected with said power fluid source for supplying control fluid to effect retraction of said piston rod during an unload mode of operation of said tray accumulator;

a fifth two-way normally closed fluid limit switch having an operator lever and connected at said load end of said track for operation responsive to extension of said piston rod during said unload mode of operation of said tray accumulator;

a control fluid pilot line from said fifth limit switch to said shuttle valve connected into said shuttle valve on an opposite side from the connection of said shuttle valve with said pilot fluid line to said first limit switch to effect operation of said four-way valve to shift said valve to supply power fluid to said cylinder for retraction of said piston rod during the unload mode of operation of said tray accumulator;

said second control fluid supply line extending through said fourth limit switch being connected with said fifth limit switch for activating said fifth limit switch responsive to operation of said fourth limit switch when a tray at said unload end of said track is removed from said track; and a manually operated load valve connected in said second control fluid line between said fourth limit switch and said fifth limit switch to permit flow of control fluid through said second control fluid line during the unload mode of operation and to deactivate said fifth limit switch during the load mode of operation of said tray accumulator.

2. A tray conveyor comprising:

fluid operated and controlled conveyor means having a load end and an unload end for holding and transporting a plurality of trays in tandem array between said load and said unload ends;

control means including a fluid flow control valve at said load end of said conveyor operative responsive to placement of a tray on said load end to activate said conveyor means to move said tray along said conveyor means;

control means including a fluid flow control valve responsive to the movement of said conveyor means one tray length to stop and recycle said conveyor means;

said conveyor means including a cylinder and piston assembly having a piston rod connected with a pusher bar and operable responsive to said control means for reciprocating said pusher bar;

a tray plate mounted at said load end of said conveyor means having a tray support surface for supporting a tray as said tray is placed on said load end of said conveyor means;

a first fluid limit switch secured on said tray plate at said load end of said conveyor means having an operator lever engageable by a tray moving from said tray plate to said load end; and a second fluid limit switch having a control lever secured at said load end of said conveyor means for operating said conveyor means to recycle said conveyor means when said conveyor means has moved a tray one tray length along said conveyor means to reposition said conveyor means for a succeeding tray placed upon said tray plate.

* * * * *